US005902947A

United States Patent [19]

Burton et al.

[11] Patent Number: 5,902,947

[45] Date of Patent: May 11, 1999

[54] SYSTEM AND METHOD FOR ARRANGING AND INVOKING MUSIC EVENT PROCESSORS

[75] Inventors: Mark T. Burton, Redmond; Todor C. Fay, Bellevue, both of Wash.

[73] Assignee: Microsoft Corporation, Redmond, Wash.

[21] Appl. No.: 09/154,335

[22] Filed: Sep. 16, 1998

[51] Int. Cl.[6] .............................. G09B 15/02; G10H 7/00

[52] U.S. Cl. ............................ 84/477 R; 84/609; 84/645; 84/649

[58] Field of Search .............................. 84/609–610, 645, 84/649–650, 447 R, 478

[56] References Cited

U.S. PATENT DOCUMENTS

| | | | |
|---|---|---|---|
| 5,734,119 | 3/1998 | France et al. | 84/622 |
| 5,827,989 | 10/1998 | Fay et al. | 84/645 |

OTHER PUBLICATIONS

Rules for Tools, Nov. 1989.

Bars & Pipes Professional User Guide, Chapters 7, 26, 28, 29, The Blue Ribbon SoundWorks, Ltd. 1993.

*Primary Examiner*—William M. Shoop, Jr.
*Assistant Examiner*—Marlon T. Fletcher
*Attorney, Agent, or Firm*—Lee & Hayes, PLLC

[57] ABSTRACT

A music processing system that processes music events includes a performance supervisor and a graph object. The graph object defines an ordered graph of music event processors, through which music events are routed. The graph object has a graph interface with methods allowing an application to insert and remove event processors in the graph. In addition, the graph interface has a method that can be called to update a music event data structure that represents the music event. This updating consists up supplying an identification of a music event processor that is next to receive the music event. Each event processor has a processor interface, which includes an initialization method and a process event method for performing the actual processing of a music event. Each processor supports one of a plurality of delivery timing modes, and also supports a subset of available event types. When inserting a music event processor in a graph, an application program can specify which instrument channel the event processor is to act upon.

39 Claims, 3 Drawing Sheets

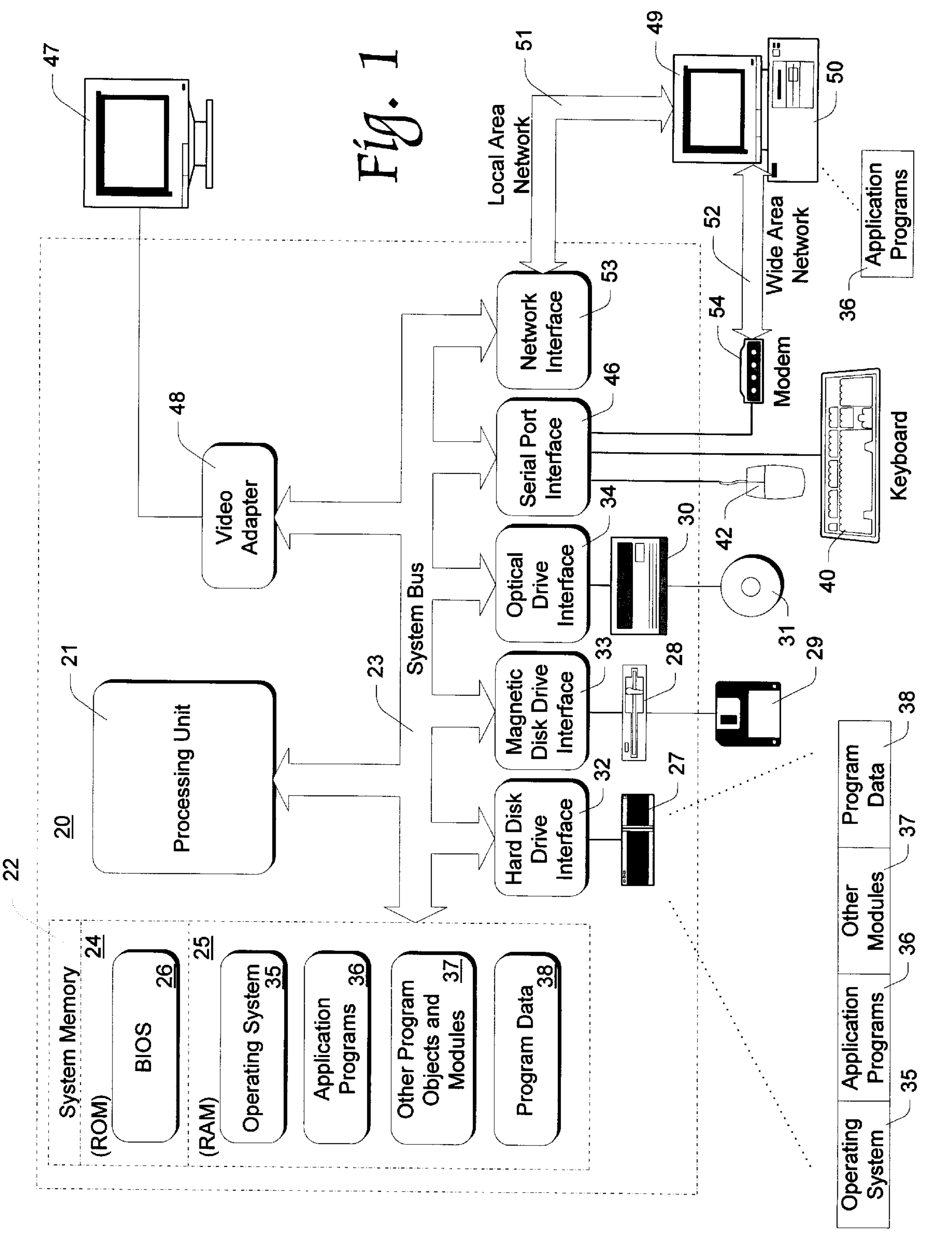
Fig. 1
47
48
Video Adapter
21
Processing Unit
20
22
System Memory
24
(ROM)
BIOS
26
25
(RAM)
Operating System
35
Application Programs
36
Other Program Objects and Modules
37
Program Data
38
23
System Bus
Hard Disk Drive Interface
32
Magnetic Disk Drive Interface
33
Optical Drive Interface
34
Serial Port Interface
46
Network Interface
53
27
28
29
30
31
42
40
Keyboard
Modem
54
52
Wide Area Network
Local Area Network
51
49
50
Application Programs
36
Operating System
35
Application Programs
36
Other Modules
37
Program Data
38

SYSTEM AND METHOD FOR ARRANGING AND INVOKING MUSIC EVENT PROCESSORS

TECHNICAL FIELD

This invention relates to computer-based musical performance devices, and in particular to methods and devices that route music events through different music event processing components.

BACKGROUND OF THE INVENTION

Musical performances have become a key component of electronic and multimedia products such as stand-alone video games, computer-based video games, computer-based slide show presentations, computer animation, and other similar products and applications. As a result, music generating devices and music playback devices are now tightly integrated into electronic and multimedia components.

In the past, musical accompaniment for multimedia products was provided in the form of digitized audio streams. While this format allowed recording and accurate reproduction of non-synthesized sounds, it consumed a substantial amount of memory. As a result, the variety of music that could be provided using this approach was limited. Another disadvantage of this approach was that the stored music could not be easily varied. For example, it was generally not possible to change a particular musical part, such as a bass part, without re-recording the entire musical stream.

More recently, it has become quite common to represent music as a stream of discrete music "events." As an example, a particular musical note might be represented as a "note event." The note event is represented by some type of data structure that includes information about the note such as pitch, duration, volume, and timing. Many such music events correspond to actions that might be performed by a keyboardist, such as pressing or releasing a key, pressing or releasing a sustain pedal, activating a pitch bend wheel, changing a volume level, changing a preset, etc.

Music events such as these are typically stored in a sequence that roughly corresponds to the order in which the events occur. Rendering software retrieves each music event and examines it for relevant information such as timing information and information relating the particular device or "instrument" to which the music event applies. The rendering software then sends the music event to the appropriate device at the proper time, where it is rendered.

A computer rendering device can have numeral logical devices or instruments, each of which plays notes having different sounds. For example, one instrument might sound like a trumpet, while another sounds like a violin. Each instrument is assigned a channel, and each music event is similarly designated with channel information. Using such channel designations, an author can designate the instrument or instruments which are to receive any particular music event.

As multimedia software has become more complex, software designers have added corresponding complexity to the rendering of event-based music. Today, software developers need the ability to change music parameters as the music is being rendered, in response to various context changes initiated by a user. For example, it might be desired to immediately change the key of a musical performance in response to a user taking a certain action in a game. Alternatively, it might be desired to change some component of the music, perhaps by adding a drum beat or adding sound effects.

To provide flexibility in implementing such features, authoring programs allow developers to develop discrete event processors, sometimes referred to as "tools," that perform simple actions with respect to a music event. Music events are passed through the event processors, in a defined sequence, in order to produce desired effects. Event processors might be used to change the key of a music performance, or to perform more complex tasks such as creating an "echo" effect. Generally, each event processor accepts a music event, either modifies the music event or takes some further action in response to the particular characteristics of the music event, and then sends the music event on to the next event processor.

Although the concept of event processors such as this is very useful, the process of organizing and managing such event processors can be awkward, particularly when application programs are used to install and organize event processors during multimedia presentations. Thus, there is a need for a straightforward and efficient architecture for organizing music event processors and for passing music events between such event processors. The invention described below meets this need.

SUMMARY OF THE INVENTION

In accordance with the invention, music events are routed through a linear graph of music event processors. Each processor performs some simple action either on the music event or in response to the music event.

A graph in this system is represented by a data object having a graph interface. An application program calls the graph interface to specify event processors for insertion into the graph, and also specifies the relative order of the processors. In addition, the application program specifies the channels upon which each event processor should act.

Actual routing of messages is accomplished by a performance supervisor. However, the performance supervisor does not maintain information relating to the ordering of event processors within a graph. Rather, the event data structure representing a music event has a variable indicating the next event processor that is to receive the music event. This variable is kept current by repeated calls to the graph interface.

Once a music event is defined and has been represented in a data structure, the data structure is passed to the performance supervisor. The performance supervisor examines the data structure to determine the next processor in the graph, and then invokes that processor. The processor performs its intended function and calls the graph interface to update the event data structure with the next processor in the graph. The event processor then returns control to the performance supervisor, which invokes the next event processor.

In selecting the next processor, the graph object considers both the channel designated for the music event and the type of the music event. A music event is routed only to those event processors that are specified to act on both the channel and the type of the music event.

The performance supervisor times the delivery of the music events relative to the times, specified in the music event data structures, when the events are to occur. Each music event data structure indicates one of three timing options, indicating when, relative to the time the event is to occur, that the event should be delivered to the event processor. In addition, the system simultaneously supports both a real or absolute time base and a music time base.

BRIEF DESCRIPTION OF THE DRAWINGS

FIG. 1 is a block diagram of a computer system that implements the invention.

DETAILED DESCRIPTION

Figure 2:
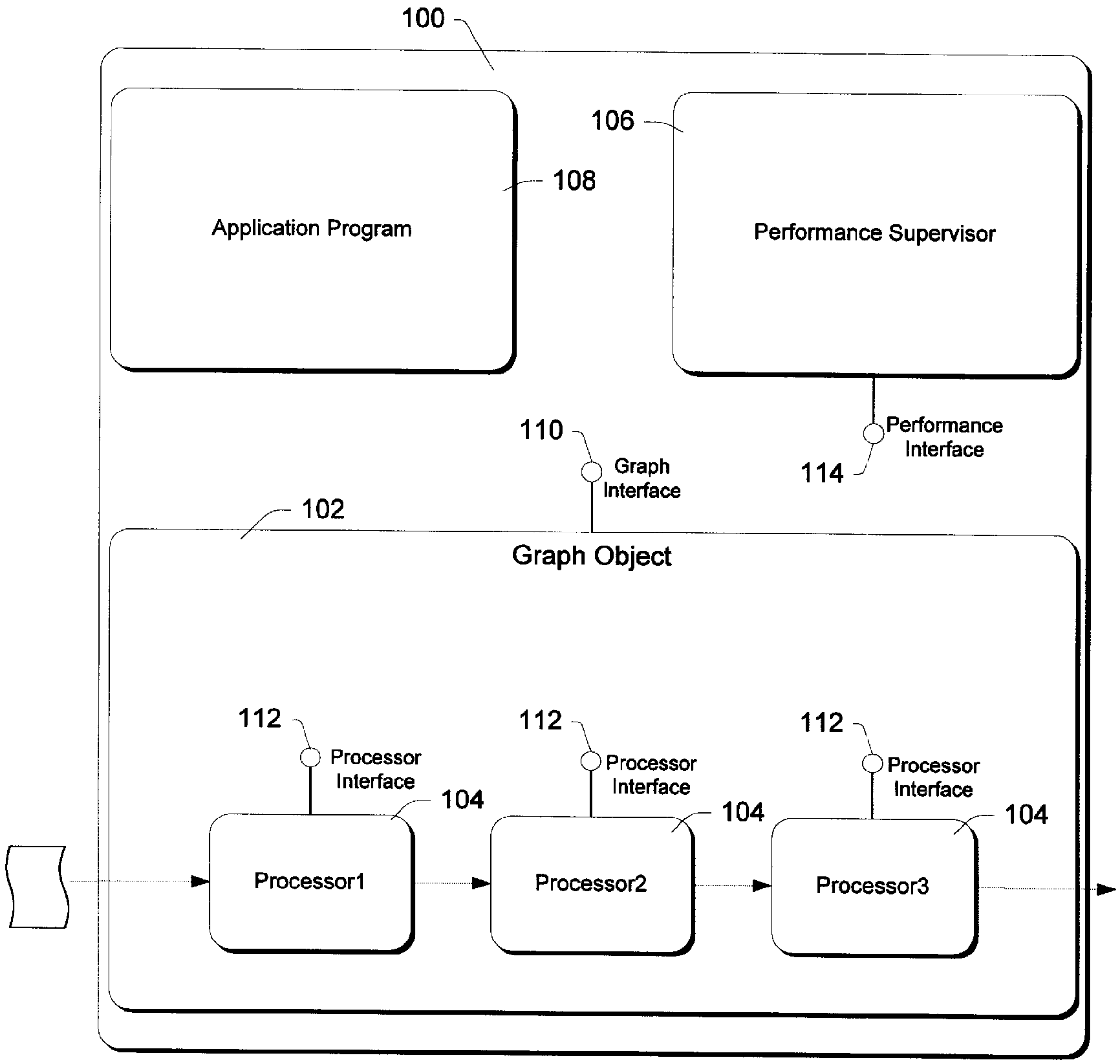
FIG. 2 is a block diagram of software components in accordance with the described embodiment of the invention.

FIG. 1 and the related discussion are intended to provide a brief, general description of a suitable computing environment in which the invention may be implemented. Although not required, the invention will be described in the general context of computer-executable instructions, such as programs and program modules, that are executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computer environments where tasks are performed by remote processing devices that are linked through a communications network. In a distributed computer environment, program modules may be located in both local and remote memory storage devices.

An exemplary system for implementing the invention includes a general purpose computing device in the form of a conventional personal computer 20, including a microprocessor or other processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs) read only memories (ROM), and the like, may also be used in the exemplary operating environment.

RAM 25 forms executable memory, which is defined herein as physical, directly-addressable memory that a microprocessor accesses at sequential addresses to retrieve and execute instructions. This memory can also be used for storing data as programs execute.

A number of programs and/or program modules may be stored on the hard disk, magnetic disk 29 optical disk 31, ROM 24, or RAM 25, including an operating system 35, one or more application programs 36, other program objects and modules 37, and program data 38. A user may enter commands and information into the personal computer 20 through input devices such as keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, personal computers typically include other peripheral output devices (not shown) such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets, and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Generally, the data processors of computer 20 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below. Furthermore, certain sub-components of the computer may be programmed to perform the functions and steps described below. The invention includes such sub-components when they are programmed as described.

For purposes of illustration, programs and other executable program components such as the operating system are illustrated herein as discrete blocks, although it is recognized that such programs and components reside at various times in different storage components of the computer, and are executed by the data processor(s) of the computer.

The illustrated computer uses an operating system such as the "Windows" family of operating systems available from Microsoft Corporation. An operating system of this type can be configured to run on computers having various different hardware configurations, by providing appropriate software drivers for different hardware components. The functionality described below is implemented using standard programming techniques, including the use of OLE (object linking and embedding) and COM (component object interface) interfaces such as described in Brockschmidt, Kraig; *Inside OLE* 2; Microsoft Press, 1994, which is hereby incorporated by reference. Familiarity with object-based programming, and with COM objects in particular, is assumed throughout this disclosure.

FIG. 2 shows a music processing system 100 in accordance with the invention for processing music events. In the described embodiment of the invention, the various components are implemented as COM objects in system memory 22 of computer 20. The COM objects each have one or more interfaces, and each interface has one or more methods. The interfaces and interface methods can be called by application programs and by other objects. The interface methods of the objects are executed by processing unit 21 of computer 20.

Music processing system 100 includes a graph data object 102 representing a processor graph. The processor graph is formed by a plurality of music processor data objects 104, alternatively referred to simply as music event processors or tools. Each music event processor is an independent software component that receives a data structure representing a music event, performs some processing based on the music event, and returns the music event for further processing. The processing might include altering the music event itself, or it might comprise taking some action (such as creating a new music event) independently of the original music event. An event processor is not required to have any knowledge of other event processors in the graph. The event processors are indexed by the graph object in a linear sequence.

Collectively, the music event processors in a graph support a plurality of music event types, while any individual event processor supports one or more of these event types. Possible event types include standard MIDI messages, standard MIDI system exclusive messages, notes in a special format, notification messages, used to synchronize applications to music timing; tempo change notifications; controller curve message (such as pitch bend or mod wheel); time signature change messages; instrument selection messages; and user defined messages.

In addition to the graph object 102 and its music event processors 104, the system 100 includes a performance supervisor 106 that routes music events through a sequence of the music event processors by calling event processing methods of the music event processors. Furthermore, FIG. 2 shows an application program 108 that initiates musical performances and that configures, arranges, and/or interacts with a graph object 102 as described below.

A music event corresponds generally to a command or instruction destined for one or more "instruments" in the music rendering system. It is represented by a data structure containing various information about the event. In the following discussion, the terms "music event" and "music event data structure" are sometimes used interchangeably, since any given music event data structure represents a corresponding music event.

In many cases, music event data structures are stored in a data file and are retrieved from the file for playback. Alternatively, an application program, the performance supervisor, or the music event processor music event processors might generate music events and corresponding data structures during real time for various purposes, possibly in response to user interactions.

In accordance with the invention, a music event data structure contains the following variables:

rtTime: a variable indicating a real-time value at which the music event should occur. This value is given in absolute time, with millisecond resolution.

mtTime: a variable indicating a "music-time" value at which the music event should occur. "Music time" is measured with reference to a tempo map maintained by the performance supervisor. It is typically measured in $768^{ths}$ of a quarter note. Once playback of a particular sequence of music events begins, there is a defined correspondence between music time and real time.

dwFlags: various control flags, which will be described below.

dwPChannel: an indication of one or more channels, or instruments, for which the music event is destined.

pTool: a pointer to the next music event processor in a sequence of such event processors—the event processor that should be next to process the music event. This variable is also referred to as a "next-processor" field in the following discussion.

pGraph: a pointer to the graph object used to process the music event.

dwType: an indication of the type of music event.

punkUser: this is a COM object pointer whose use is defined by an application program, allowing the application program to indroduce new message types and reference them via a COM pointer.

Further data is embedded or sub-classed in the data structure, depending on the music event types.

The flag variable dwFlags includes two flags that correspond respectively to variables rtTime and mtTime. Each flag indicates whether its corresponding variable is valid. Generally, only one of the rtTime and mtTime variables is required to be valid at any given time. For example, a particular music event processor is free to modify one of the variables without modifying the other. However, in this case the event processor should reset one of the flags to indicate that the corresponding variable is not valid. The performance supervisor checks the flags periodically and re-calculates any invalid variable based on the other, valid variable, and then sets the corresponding flag.

The flags also include a flag indicating a delivery timing method for the music event data structure. Although each music event data structure contains an indication of when the corresponding music event should occur, this does not necessarily correspond to the time that a data structure should be delivered to any particular music event processor, since the music event processor might perform preprocessing, ahead of the actual time when the music event actually occurs. Accordingly, this flag should indicate the appropriate timing for delivery of a music event to the event processor indicated by the pTool variable.

There are three options for timing delivery:

Immediate indicates that a data structure can be delivered to the next event processor at any time prior to the time when the event is to occur.

Queue indicates that the data structure is to be delivered to the next event processor at a predetermined time prior to the time when the music event is to occur. The event processor processes the music event during this time, and either initiates the music event or sends the data structure to the next event processor after the predetermined time. The predetermined time is typically equal to about 100 milliseconds.

AtTime indicates that the message is to be delivered exactly when the corresponding music event is to occur. This option is used to for synchronization purposes.

Graph data object 102 has a graph interface 110. Graph interface 110 in turn includes methods that are callable by application program 108, by performance supervisor 106, and by music event processors 104. The graph interface includes at least the following relevant methods:

A processor_insert method for inserting processor data objects into the processor graph. An application program uses this method to build a graph, consisting of an ordered, linear sequence of music event processors. Through this method, the application provides a pointer to a music event processor and specifies its position in the graph. In addition, the application indicates which channels are to be processed by the music event processor. Each processor is designated to act upon one or more channels.

A processor_remove method for removing processor data objects from the processor graph. Both this method and the processor_insert method can be used during a musical performance to change the graph and to thereby change the characteristics of the musical performance as it happens.

A next_processor method for indicating a subsequent music event processor in the graph.

The next_processor method is called with a music event data structure as an argument. This method updates the pTool variable of the music event data structure, so that pTool indicates the next music event processor in the graph. More specifically, the next_processor method first looks at the current music event processor indicated by the pTool variable of the music event structure, refers to its internal index of graph processors and their order within the graph, determines the event processor that follows the current processor in the graph, and updates variable pTool to indicate this subsequent event processor.

The next_processor method also updates the timing delivery flag in the music event data structure, to indicate the timing delivery method that is to be used in conjunction with the event processor indicated by the pTool variable. The performance supervisor obtains this information by calling a delivery_timing method that is exposed by the next event processor. The delivery_timing method is described below.

The music event processors themselves are potentially written by developers, or can be provided as standard components of a music composition system. A music event processor can perform an infinite variety of functions, but each processor implements a standard COM interface indicated in FIG. 2 as a processor interface 112. The interface exposes the following relevant methods:

An initialization method for initializing the event processor. This method is called by graph object 102 when the event processor is placed in a graph with the processor_insert method.

A delivery_timing method for returning delivery timing options used by the event processor. Graph object 102 calls this method when the event processor is placed in the graph, and during the next_processor method, to determine which of the three available delivery timing options are to be used when passing a music event to the event processor. The three options are Immediate, Queue, and AtTime, as described above.

One or more delivery_type methods for indicating types of music events processed by the event processor. Graph object 102 calls these methods when the event processor is placed in the graph, to determine which type of music events are supported by the event processor. In an actual embodiment of the invention, these methods include one method that returns an array containing codes representing the supported event types, and another method that returns the size of the array.

A process_event method for actually processing music events. The process_event method accepts a music event data structure as an argument, and processes the data structure in accordance with the intended function of the event processor. The event processor can change values in the data structure, create additional music events and pass them on either alone or in addition to the original music event, or even discard the original music event. In addition, the process_event method can initiate actions (such as user-interactions) that are unrelated to the actual musical performance.

The process_event method is normally called by the performance supervisor, and upon concluding returns a code indicating how the performance supervisor should continue to handle the music event that has just been processed by the event processor. There are three possibilities: (a) the performance supervisor should free or de-allocate the memory used by the music event data structure (essentially deleting the music event and destroying the event data structure); (b) deliver the music event to the next event processor, as indicated by variable pTool of the event data structure; or (c) do nothing further with the music event (indicating that the event processor is handling the music event in some special way).

The process_event method is responsible for calling the next_processor method of graph object 102. Thus, when the music event is returned to the performance supervisor for further routing, the pTool variable has already been updated to indicate the next processor in the graph.

An event processor can implement its own interfaces, so that application program 108 can communicate with the event processors before, during, or after a music performance. For example, a transposition event processor might have an interface allowing an application program to set a transposition value.

In addition, each event processor may support an IPersistStream object interface. IPersistStream provides a standard mechanism for loading data from a file stream. Each event processor defines its own file format. When the graph object loads an event processor from a file or a file stream, it passes the chunk of data that pertains to the IPersistStream object interface of the event processor in the form of an IStream object.

The performance supervisor 106 manages the delivery of music events by handling all message delivery in a high priority thread. This thread wakes up when a music event data structure is due to be delivered to an event processor, calls the process_event method of the event processor (with the event data structure as an argument), then requeues the data structure as appropriate to deliver it to the next event processor in the graph. The performance supervisor has a performance interface 114 that supports at least the following methods:

A message_allocation method for allocating a music event data structure, representing a music event. An application program or any other program module can call the message_allocation method to request a data structure of a specified size, and the performance supervisor returns a pointer to such a data structure.

A message_de-allocation method for de-allocating a music event data structure. This frees the data structure, and returns it to a list of free memory.

A send_message method for sending a music event data structure to a music event processor. This method sends a specified music event data structure to the music event processor specified in the pTool variable of the music event data structure. Before send_message is invoked, the data structure's pTool variable must be updated with the next event processor to receive the music event, and variable dwFlags must indicate a delivering timing option that corresponds to the event processor specified by pTool. These values are normally validated by a previous call to the next_processor method of graph object 102. In addition, the rtTime or the mtTime variable must indicate a valid delivery time. If either one of these variables is invalid (as indicated by its corresponding flag), the send_message method automatically updates it.

Figure 3:
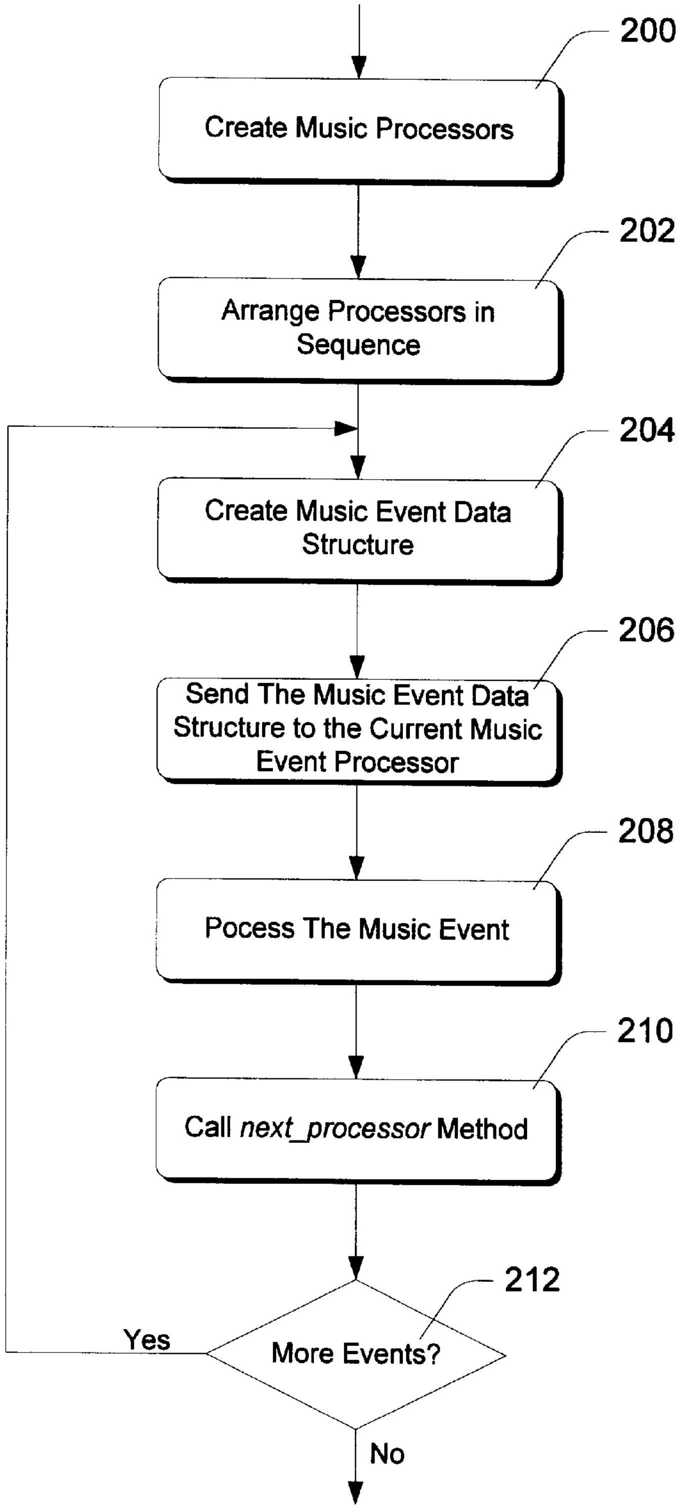
FIG. 3 is a flowchart showing preferred steps in accordance with the invention.

FIG. 3 illustrates how the various objects, interfaces, and methods of FIG. 2 interact to create a processor graph and to route music events through the graph.

A step 200 comprises creating a plurality of music event processors. Event processors can be supplied as part of a music composition system, or developed independently by third-party developers or end-users of the music composition system.

Step 202 comprises arranging the event processors in a desired sequence. This step is accomplished by application program 108, by calling graph interface 110. Specifically, the application program calls the processor_insert method to define an ordered graph of the music event processors. In addition, the application program can call either the processor_insert method or the processor_remove method at any time during a music performance to rearrange the graph. When an event processor is placed in a graph, the graph object calls the initialization method of the event processor. It also calls the delivery_type and delivery_timing methods to obtain needed information about the event processor for delivery and timing purposes.

A step 204 comprises creating a music event data structure that represents a music event. This step is performed when the application program calls the performance manager's message_allocation method. The data structure has a defined structure that includes a next-processor field. The next-processor field, variable pTool in the discussion above, indicates a music event processor that is next to receive the event data structure. This field is initialized by setting it to zero, and by then calling the next_processor method of graph object 102.

A step 206 comprises sending the music event data structure to a current music event processor, indicated by the next-processor field of the event data structure. This step is accomplished by calling the send_message method of the performance supervisor. The send_message method examines the next-processor field of the event data structure to determine which event processor is next to receive the message. In addition, the send_message method examines the delivery time and the delivery timing option specified in the data structure to determine when the data structure should be sent to the event processor. The data structure is queued until that time. At the appropriate time, the performance supervisor sends the music event data structure to the currently-indicated event processor by calling the process_event message of the event processor.

The music event processor processes the music event represented by the data structure in a step 208. It then performs a step 210 of calling the next_processor method of graph object 102 to update the next-processor field of the event data structure. After this call, the next-processor field indicates the next music event processor that is to receive the event data structure. As described above, the next_processor method also updates the delivery timing options indicated in the data structure. The event process then concludes, returning control to the performance supervisor.

Depending on the return value, the performance supervisor re-queues the music event data structure, and sends it to the next event processor. Steps 204, 206, 208, and 210 are thus repeated, as indicated by decision block 212, until there are no more music events to process.

As an alternative, not shown, a current event processor can call the next event processor more directly, with a call to the send_message method of the performance supervisor.

Note that each event processor defines the types of music events that it will process. In contrast, the application program defines, when configuring the graph, which channels will be acted upon by each event processor. In the next_processor method of the graph object, the graph object notes the channel and type of a particular music event, and when updating the pTool variable of the data structure indicates only those event processors that are specified to act on both the channel and the type of the music event represented by the data structure. In other words, a music event is routed only through those event processors that support or are designated to act upon the particular type and channel of the music event.

This mechanism allows relatively sophisticated routing maps to be established. Although a graph defines a linear progression of event processors, any individual processor can be bypassed if it does not support a particular music type, or if it is not designated to act upon a particular channel.

Note also that the individual music event processor are oblivious to the other event processors. Instead of having information about neighboring processors, the graph object maintains such information. Each of the music event processors calls the same graph interface of graph object 102 to update the pTool variable of a music event data structure. This allows each of the event processors to interact with the overall system in the same way, so that each processor can be used in many different situations.

The described system provides a number of advantages over the prior art. For example, it provides a simple processor model, making it relatively easy to program new event processors. Each processor is required to support only a limited number of interface methods, and each processor processes only individual events.

It is also relatively simple to insert an event processor in an ordered sequence. The graph object manages and maintains a linear list of event processors, and an application program has only to insert processors at appropriate locations.

There is also a simple mechanism for managing the routing of music events through event processors. The graph object provides a standard method to update a music event data structure so that it contains an indication of the next event processor in the graph. Because of this, the event processor can rely on the graph object to manage the routing of messages, and the graph object can bypass event processors that are not appropriate for a particular music event.

The system supports multiple event types. Events are not limited to music media, but can be extended to other types of message- or event-based media.

Event processors themselves control which events types they process. If an event processor does not support a particular event type, the graph object routes events of that type around the event processor.

Application programs can specify which event channels should be acted upon by various event processors. If an event processor is not designated to act upon a particular channel, music events relating to that channel will be routed around that event processor. Furthermore, the channel model used in the actual embodiment of the invention allows a full integer range of channels, rather than only the 16 allowed by MIDI implementations.

The system supports multiple delivery timing options, meeting the needs of different types of event processors.

The system supports both music-time and real-time timing models. All music event data structures have two time fields—one in music time and one in absolute, real time—indicating when a particular music event should occur. The performance supervisor maintains a tempo map to translate between these time bases. If a particular event processor alters either time field, it sets a flag indicating which format it adjusted, and the performance supervisor re-calculates the other field before sending the music event to the next event processor.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

We claim:

1. A music processing system that processes music events, comprising:

a stored graph data object representing a processor graph, the graph data object having a graph interface;

a plurality of stored music processor data objects, each having a processor interface;

the graph interface having methods comprising:

a processor insert method for inserting processor data objects into the processor graph;

a processor remove method for removing processor data objects from the processor graph;

a next-processor method for indicating a subsequent processor data object in the processor graph;

the processor interface of a particular processor data object having methods comprising:

a process event method for processing a music event;

an initialization method for initializing the particular processor data object;

a delivery timing method for returning delivery timing options used by the particular processor data object;

one or more delivery type methods for indicating types of music events processed by the particular processor data object.

2. A music processing system as recited in claim 1, further comprising a performance supervisor that routes music events through a sequence of the processor data objects by calling the process event methods of said processor data objects.

3. A music processing system as recited in claim 1, wherein:

a music event is represented by a music event data structure;

the music processing system further comprises a performance supervisor that routes music event data structures through a sequence of the processor data objects by calling the process event methods of said processor data objects;

after calling the process event method of a particular processor data object with a particular music event data structure, the next-processor method updates the music event data structure to identify a processor data object that is next in the processor graph.

4. A music processing system as recited in claim 1, wherein:

a music event is represented by a music event data structure;

the music processing system further comprises a performance supervisor that routes music event data structures through a sequence of the processor data objects by calling the process event methods of said processor data objects;

after calling a particular process event method of a particular processor data object with a particular music event data structure, said particular process event method calls the next-processor method of the graph interface to update said particular music event data structure with an identification of a processor data object that is next in the processor graph.

5. A music processing system as recited in claim 1, wherein:

a music event is represented by a music event data structure;

the music processing system further comprises a performance supervisor that routes music event data structures through a sequence of the processor data objects by calling the process event methods of said processor data objects;

after calling a particular process event method of a particular processor data object with a particular music event data structure, said particular process event method calls the next-processor method of the graph interface to update said particular music event data structure with an identification of a processor data object that is next in the processor graph;

the performance supervisor calls the process event method of the identified processor data object upon a return from said particular process event method.

6. A music processing system as recited in claim 1, wherein the processor data objects collectively support a plurality of music event types, and wherein each processor data objects supports one or more of said plurality of music event types.

7. A music processing system as recited in claim 1, further comprising:

a performance supervisor that routes music events through a sequence of the processor data objects by calling the process event methods of said processor data objects;

wherein the processor data objects collectively support a plurality of music event types, and wherein each processor data objects supports one or more of said plurality of music event types;

wherein the performance supervisor routes a particular type of music event only through those processor data objects that support that type of music event.

8. A music processing system as recited in claim 1, wherein:

a music event is represented by a music event data structure;

the music event data structure indicates an instrument channel.

9. A music processing system as recited in claim 1, wherein different music events are specified as being destined for different instrument channels, and wherein each processor data objects is designated to act upon one or more of said instrument channels.

10. A music processing system as recited in claim 1, further comprising:

a performance supervisor that routes music events through a sequence of the processor data objects by calling the process event methods of said processor data objects;

wherein different music events are specified as being destined for different instrument channels, and wherein each processor data objects is designated to act upon one or more of said instrument channels;

wherein the performance supervisor routes a particular music event only through those processor data objects that are designated to act upon the instrument channels specified by that music event.

11. A music processing system as recited in claim 1, wherein:

a music event is represented by a music event data structure;

the music event data structure includes (a) a music-time indication of when the music event should occur, and (b) a real-time indication of when the music event should occur.

12. A music processing system as recited in claim 1, wherein:

a music event is represented by a music event data structure;

the music event data structure includes (a) a music-time indication of when the music event should occur, (b) a real-time indication of when the music event should occur, and (c) one or more flags indicating whether the time indications are valid.

13. A music processing system as recited in claim 1, wherein:

a music event is represented by a music event data structure that includes a time indication of when the music event should occur;

the delivery timing method of a particular processor data object indicates when the music event data structure should be delivered to said particular processor data object, relative to the time indication in the music event data structure.

14. A music processing system as recited in claim 1, further comprising a stored performance supervisor having a performance interface, the performance interface having methods comprising:

a message allocation method for allocating a music event data structure that represents a music event;

a message de-allocation method for de-allocating a music event data structure;

a send message method for sending a music event data structure to a processor data object specified in the music event data structure.

15. A method of routing music events through a plurality of music event processors, comprising the following steps:

creating a music event data structure that represents a music event, the music event data structure containing a next-processor field that indicates a music event processor that is next to receive the event data structure;

sending the music event data structure to a current music event processor that is indicated by the next-processor field of the music event data structure;

processing the music event in the current music event processor;

calling a graph interface from the current music event processor to update the next-processor field of the music event data structure to indicate a next music event processor to receive the music event data structure;

sending the music event data structure to the next music event processor;

wherein each of the music event processors calls the same graph interface to update the next-processor field.

16. A method as recited in claim 15, wherein the current music event processor sends the music event data structure to the next music event processor.

17. A method as recited in claim 15, wherein the current music event processor returns without sending the music event data structure to the next music event processor, and a performance supervisor sends the music event data structure to the next music event processor.

18. A method as recited in claim 15, further comprising a step of calling the graph interface from an application program to define an ordered graph of music event processors that include the current and next music event processors.

19. A method as recited in claim 15, wherein:

each music event processor processes certain types of music events;

each music event data structure indicates one or more of the types of music events;

for a music event data structure indicating a particular type of music event, the graph interface updates the next-processor field to indicate only a next music event processor that processes the particular type of music event.

20. A method as recited in claim 15, further comprising a step of calling the graph interface from an application program to define an ordered graph of music event processors that include the current and next music event processors, wherein:

when defining the ordered graph, the application program specifies that each of the music event processors is to act upon one or more instrument channels;

each music event data structure indicates one or more instrument channels;

for a music event data structure indicating a particular instrument channel, the graph interface updates the next-processor field to indicate only a next music event processor that is specified to act upon that particular instrument channel.

21. A method as recited in claim 15, wherein:

the music event data structure includes a time indication of when the represented music event should occur;

each music event processor indicates when the music event data structure should be delivered to the music event processor, relative to the time indication in the music event data structure;

the sending steps are performed when indicated by the music event processor relative to the time indication in the music event data structure.

22. A method as recited in claim 15, wherein:

the music event data structure includes (a) a music-time indication of when the represented music event should occur; and (b) a real-time indication of when the music event should occur;

each music event processor indicates when the music event data structure should be delivered to the music event processor, relative to the time indications in the music event data structure;

the sending steps are performed when indicated by the music event processor relative to the time indications in the music event data structure.

23. A computer, comprising:

one or more data processors;

a plurality of music event processors that are executable by the one or more data processors to process music events, such music events being represented by music event data structures;

a graph manager that is callable by an application program to define an ordered graph of the music event processors;

a performance manager that is executable by the one or more data processors to send the music event data structures to the music event processors in a sequence indicated by the graph manager.

24. A computer as recited in claim 23, wherein the graph manager has an interface that is callable to indicate which of the music event processors is next to receive music event data structure.

25. A computer as recited in claim 23, wherein:

each music event data structure contains a next-processor field that indicates which of the music event processors is next to receive the music event data structure;

the graph manager has an interface that is callable to update the next-processor field.

26. A computer as recited in claim 23, wherein:

each music event data structure contains a next-processor field that indicates which of the music event processors is next to receive the music event data structure;

the graph manager has an interface that is callable to update the next-processor field;

when a particular music event processor processes a music event represented by a music event data structure, the music event processor calls the graph manager to update the next-processor field of the music event data structure.

27. A computer as recited in claim 23, wherein:

each music event data structure contains a next-processor field that indicates which of the music event processors is next to receive the music event data structure;

the graph manager has an interface that is callable to update the next-processor field;

when a particular music event processor processes a music event represented by a music event data structure, the music event processor calls the graph manager to update the next-processor field of the music event data structure and then returns the music event data structure to the performance manager;

the performance manager sends music event data structures to the music event processors indicated by the next-event fields of the music event data structures.

28. A computer as recited in claim 23, wherein:

each music event processor processes certain types of music events;

the graph manager has an interface that is callable to indicate which of the music event processors is next to receive a music event data structure;

each music event data structure indicates one or more types of music events;

for any particular music event data structure indicating a particular type of music event, the graph manager indicates only those music event processors that process the particular type of music event.

29. A computer as recited in claim 23, wherein:

when defining the ordered graph, an application program specifies that each of the music event processors is to act upon one or more instrument channels;

each music event data structure indicates one or more channels;

the graph manager has an interface that is callable to indicate which of the music event processors is next to receive a music event data structure;

when indicating which of the music event processors is next to receive a music event data structure, the graph manager indicates only those music event processors that are specified to act upon the channels indicated by the music event data structure.

30. A computer as recited in claim 23, wherein:

each music event processor processes certain types of music events;

when defining the ordered graph, an application program specifies that each of the music event processors is to act upon one or more instrument channels;

each music event data structure indicates one or more channels and types of music events;

the graph manager has an interface that is callable to indicate which of the music event processors is next to receive a music event data structure;

when indicating which of the music event processors is next to receive a music event data structure, the graph manager indicates only those music event processors (a) that are specified to act upon the channels indicated by the music event data structure and (b) that process the type of music event indicated by the event data structure.

31. A computer as recited in claim 23, wherein the music event data structure includes (a) a music-time indication of when the represented music event should occur; and (b) a real-time indication of when the music event should occur.

32. A computer as recited in claim 23, wherein the music event data structure includes (a) a music-time indication of when the represented music event should occur; (b) a real-time indication of when the music event should occur; and (c) one or more flags indicating whether the respective time indications are valid.

33. A computer as recited in claim 23, wherein:

the music event data structure includes (a) a music-time indication of when the represented music event should occur; (b) a real-time indication of when the music event should occur; and (c) one or more flags indicating whether the respective time indications are valid;

the performance manager updates one of the indications of when the represented music should occur if the flags indicate that said indication is not valid.

34. A computer as recited in claim 23, wherein:

the music event data structure includes a time indication of when the represented music event should occur;

each music event processor indicates a time when the music event data structure should be delivered to the music event processor, relative to the time indication in the music event data structure;

the performance manager sends a particular music event data structure to a particular music event processor at the indicated time relative to the time indication in the music event data structure.

35. One or more computer-readable storage media containing instructions for implementing a music processing system, the instructions performing steps comprising:

calling a graph interface from an application program to define an ordered graph of music event processors, wherein each music event processor is executable to process a music event that is represented by a music event data structure, wherein each music event data structure contains a next-processor field that indicates a music event processor that is next to receive the event data structure;

routing music event data structures through the ordered graph with a performance manager that examines the next-processor field to determine the next music event processor that is to receive the event data structure;

in response to a music event processor receiving a music event data structure, processing the music event represented by the music event data structure;

when processing the music event represented by the music event data structure, calling the graph interface to update the next-processor field of the music event data structure.

36. One or more computer-readable storage media as recited in claim 35, wherein:

each music event processor is defined to process certain types of music events;

each music event data structure indicates one or more of the types of music events;

for a music event data structure indicating a particular type of music event, the graph interface updates the next-processor field to indicate only a next music event processor that is defined to process the particular type of music event.

37. One or more computer-readable storage media as recited in claim 35, wherein:

when defining the ordered graph, the application program specifies that each of the music event processors is to act upon one or more instrument channels;

each music event data structure indicates one or more instrument channels;

for a music event data structure indicating a particular instrument channel, the graph interface updates the next-processor field to indicate only a next music event processor that is specified to act upon that particular instrument channel.

38. One or more computer-readable storage media as recited in claim 35, wherein:

the music event data structure includes a time indication of when the represented music event should occur;

each music event processor indicates when the music event data structure should be delivered to the music event processor, relative to the time indication in the music event data structure;

the performance manager sends a particular music event data structure to a particular music event processor when indicated by the music event data processor relative to the time indication in the music event data structure.

39. One or more computer-readable storage media as recited in claim 35, wherein:

the music event data structure includes (a) a music-time indication of when the represented music event should occur; and (b) a real-time indication of when the music event should occur;

each music event processor indicates when the music event data structure should be delivered to the music event processor, relative to the time indications in the music event data structure;

the performance manager sends a particular music event data structure to a particular music event processor when indicated by the music event data processor relative to the time indications in the music event data structure.

* * * * *